United States Patent

Sassin et al.

Patent Number: 6,058,435
Date of Patent: May 2, 2000

[54] APPARATUS AND METHODS FOR RESPONDING TO MULTIMEDIA COMMUNICATIONS BASED ON CONTENT ANALYSIS

[75] Inventors: Michael Sassin, San Jose; Neal J. King, Oakland; Naser Sheikhzadegan, San Jose, all of Calif.

[73] Assignee: Siemens Information and Communications Networks, Inc., Boca Raton, Fla.

[21] Appl. No.: 08/794,356

[22] Filed: Feb. 4, 1997

[51] Int. Cl.[7] ........................................ G06F 13/00
[52] U.S. Cl. ............................... 709/305; 379/265
[58] Field of Search ........................ 709/305; 379/265, 379/266, 210, 211, 220, 212, 221

[56] References Cited

U.S. PATENT DOCUMENTS

| | | | |
|---|---|---|---|
| 5,046,088 | 9/1991 | Margulies | 379/211 |
| 5,206,903 | 4/1993 | Kohler | 379/309 |
| 5,309,513 | 5/1994 | Rose | 379/265 |
| 5,361,353 | 11/1994 | Carr et al. | 395/700 |
| 5,506,898 | 4/1996 | Costantini et al. | 349/93 |
| 5,550,966 | 8/1996 | Drake et al. | 395/154 |
| 5,561,711 | 10/1996 | Muller | 379/266 |
| 5,576,951 | 11/1996 | Lockwood | 705/27 |
| 5,576,954 | 11/1996 | Driscoll | 395/603 |
| 5,592,542 | 1/1997 | Honda et al. | 379/265 |
| 5,592,543 | 1/1997 | Smith et al. | 379/265 |
| 5,594,791 | 1/1997 | Szlam et al. | 379/265 |
| 5,684,870 | 11/1997 | Maloney et al. | 379/212 |
| 5,721,770 | 2/1998 | Kohler | 379/266 |
| 5,793,861 | 8/1998 | Haigh | 379/266 |
| 5,825,869 | 10/1998 | Brooks et al. | 379/265 |
| 5,828,747 | 10/1998 | Fisher et al. | 379/309 |
| 5,831,665 | 11/1998 | Dezonno | 348/14 |
| 5,832,059 | 11/1998 | Aldred et al. | 379/34 |
| 5,915,012 | 6/1999 | Miloslavsky | 379/220 |

OTHER PUBLICATIONS

Stuart Warren "Speech Rec Rules", Computer Telephony, pp. 79–89, Jun. 1996.

Primary Examiner—Moustafa M. Meky

[57] ABSTRACT

A routing method for an information distribution system, such as an automatic communications distribution system, allows substantial content freedom in the formulation of a message to the system. The messages are converted to a computer-searchable format and are subjected to content analysis to identify skills advantageous to responding to the messages. In one application, the incoming message is a facsimile transmission that is converted to computer-generated text information using an optical character recognition module. The freeform incoming message may also be a voice mail message converted using speech recognition techniques, or may be a video transmission, electronic mail or a Webpage referral. In an application of the method and system that includes a response from an agent of the system, résumé data indicative of proficiencies of the agents with respect to skills advantageous to processing the communications are correlated with the identified desired skills for a particular incoming communication. Based upon the correlation, the incoming communication is routed to the appropriate agent.

24 Claims, 5 Drawing Sheets

FIG_2

FIG_3

APPARATUS AND METHODS FOR RESPONDING TO MULTIMEDIA COMMUNICATIONS BASED ON CONTENT ANALYSIS

BACKGROUND OF THE INVENTION

The invention relates generally to systems and methods for automatically analyzing the content of multimedia communications and responding to the communications based on their content. More particularly, incoming communications are routed for response based upon a correlation between the content of the communication and certain parameters of a set of connectivity options.

DESCRIPTION OF THE RELATED ART

The present invention can be implemented in a wide variety of systems in which the response to a communication can advantageously depend on the content of the communication. A simple example of such a system is an information retrieval service, in which the service receives a communication from a customer requesting certain information, and the service responds by sending the requested information to the customer. The present invention can be used to implement such systems. The preferred embodiment of the present invention is described in connection with a call center.

Call centers are organizations set up by companies or individuals to handle large volumes of telephone-based business transactions. Call centers provide an efficient alternative to performing business transactions in a face-to-face manner. For example, rather than renting a commercial space in a shopping area in order to sell merchandise to the general public, a company may mail out catalogs which advertise the merchandise and a telephone number that can be used to order the merchandise.

There are many organizational styles for call centers. Typically, the necessary telecommunications equipment includes an automatic call distribution (ACD) system that provides call management. The system may be physically located on the premises of the company or may be on the premises of a central service provider, such as a regional telephone company. The ACD agents may all be employees of the company or may be employees of a business enterprise that provides call-handling services to a number of unrelated companies. Conventionally, ACD agents are located at offices, but telecommuting agents are utilized as well. In addition to the sale of retail merchandise, call centers and ACD systems are used for such applications as product support to provide information regarding products of a company, brokerage call management in the sale of stocks and bonds, and utility customer service call management for handling questions regarding service and billing.

In its simplest form, the incoming calls have little variation and can be handled equally well by any of the ACD agents. The selection of an agent to handle the next incoming call may then take a longest-idle-agent approach, which directs the calls based upon the idle times of the agents. However, in many call center environments, the agents are not equally adept at performing all types of transactions. For example, in a product support facility, different agents may be responsible for handling calls regarding different classes of products, e.g., a first group is knowledgeable with respect to a word processing program, a second group is knowledgeable with respect to a database program, and a third group is knowledgeable with respect to a spreadsheet program. Even within a specific group, there may be a need for individuals to possess different call-handling skills, e.g., agents within the same group who speak different languages. "Specialists" within the call center are important if the center is to have a sufficiently high level of transactional throughput without training all of the agents to be knowledgeable in all areas.

Thus, while the traditional call routing approach works well for environments in which all agents are equally well qualified and all of the calls are similar, the approach may be inadequate in other applications. Siemens Corp. has developed a skills-based routing approach for such applications. A call is routed to one of the agents based upon a correlation of the attributes of the agent with identified skills that are advantageous to efficiently processing the call. That is, for each call that is to be distributed, skills that are relevant to efficient handling of the call are identified and then used to route the call to an appropriate agent. Stored "résumés" of the agents quantify how well the agents are qualified with respect to meeting different requirements of calls. For example, a skills expression of a particular agent may identify a skill level from 0 to 9 for each of 250 different skills. The skills-based routing may also consider preferences of the system for particular agents handling particular types of calls. For example, if a number of agents possess SKILL A and SKILL B, but only one of the agents also possesses SKILL C, the system might place a higher preference for the other agents to handle calls requiring SKILL A and SKILL B. The preference would increase the chances that the agent having SKILL C will be available when an incoming call requires SKILL C. The goal of the skills-based approach is to match each call with the "best" available agent. A somewhat less efficient skills-based approach is described in U.S. Pat. No. 5,206,903 to Kohler et al.

There are a variety of techniques for obtaining the information necessary for determining the skills that are advantageous to processing a particular call. Automatic number identification (ANI) passes the telephone number of a calling party through a public telephone network to the ACD system. This information may be used to access information regarding the calling party, as determined by prior communications with the party. This caller-specific information may be stored within a database lookup table. Utilization of a dialed number identification service (DNIS) may also be used to determine call requirements. In a product support environment, each product may be associated with a different phone number, so that the product of interest to the caller may be determined by the dialed number. Interactive voice response (IVR) may also be utilized. IVR presents messages to the caller, with the caller being prompted to depress certain buttons on the phone keypad depending upon call requirements.

There are concerns relating to these techniques for determining call requirements. For example, if ANI is utilized to access the calling party's information from a database lookup table accumulated from prior communications, the calling party will be misrouted if the subject matter of the call is different than the subject matter of prior calls. Another concern is that the subject matter of a call may be outside of the prepared menu and decision tree of an IVR unit. In many applications, such a situation will result in the call being routed by default to a human operator. However, 24-hour information systems typically do not include a human-operator backup after normal working hours. This leaves the calling party without options. A third concern is that the known skills-based routing systems are limited with respect to both the type of information that can be conveyed to the system by the caller and the medium for conveying the information.

What is needed is a communications-routing method and system that increase a party's input to a process for efficiently processing communication with the party and/or providing information to the party.

SUMMARY OF THE INVENTION

A routing method and system utilize incoming communications having substantial content freedom to determine the routing process for responding to the incoming communication. "Content freedom" is defined as an independence in describing the subject matter that is of interest to the party submitting the communication. For example, the incoming communication may be an electronic mail message, a facsimile transmittal, or a text message originating from a site on the World Wide Web. The incoming communication may also be a freeform telephone voice mail message, which would not be restricted to the dual tone multifrequency (DTMF) responses to prompts presented in a decision tree of known call routing systems. In another embodiment, the incoming communication is a video message, such as a photograph, which is received and content analyzed for system-recognizable features. The system-recognizable features are then used as a basis for determining the means for responding to the communication.

In the preferred embodiment, the routing method and system are used to selectively distribute communications to individuals of one or more groups. Résumé data indicative of proficiencies of the individuals with respect to skills advantageous to processing different types of communications are stored. If the system, such as an automatic call distribution (ACD) system, includes a number of distinct groups, the résumé data may be identical for each individual within a particular group. However, the preferred embodiment individualizes the résumé data, so that particular skills of an individual may be used in determining the "best fit" of a communication to an individual.

The content of an incoming communication having substantial content freedom is converted to a program-searchable format. For example, a received facsimile communication may be converted to computer-generated text information using an optical character recognition (OCR) program. Similarly, a voice mail message may be converted to computer-generated text information using speech recognition techniques. For electronic mail and Webpage referrals, formatting the content into a program-searchable format may be simplified. For example, the header information of an electronic mail message may simply be stripped from the message. Reformatting a video message may be accomplished by generator "descriptors," such as labels representative of the system-recognizable features.

A search of the content of a formatted incoming communication is executed to determine which skills are advantageous to processing the communication. In one embodiment, the search is a word query of the computer-generated text information. The word query may be a Boolean keyword search in which the keywords are linked by logical operatives such as "AND," "OR" and "NOT" or their functional equivalents.

At least partially based upon correlations between the stored résumé data of the individuals and the determined skills that are advantageous to processing the incoming communications, the incoming communications are routed to the individuals on a one-by-one basis. The Boolean search may determine that the person who submitted a communication, such as a voice mail message, requires an individual who is skilled with respect to a database program, with respect to speaking Portuguese, and with respect to a specific computer operating system. The determined call-handling skills are then used to find a match to the stored résumé data of an individual in order to efficiently process the communication.

In another embodiment, the routing method is used within an information distribution system that does not necessarily include human-to-human contact. An incoming communication having significant freedom of message content is received from a submitting party and is converted into a computer-searchable format. Content analysis of the formatted message is then executed in order to determine criteria for conveying desired information responsive to the incoming communication. Based upon the determined criteria, a connectivity option is selected from among a number of available connectivity options. A connection with the submitting party is then established in accordance with the selected connectivity option. In one application of this embodiment, the submitting party is a caller to an information distribution system and the communication is a statement of a concern, issue, or question. The statement is converted into a computer-searchable format and is content analyzed to determine the "best fit" within a menu of information-conveying recordings. In a second exemplary application, a received facsimile transmission is converted into a computer-searchable format and is subjected to a Boolean keyword search to automatically determine which one of a variety of facsimile options (i.e., connectivity options) should be transmitted to the submitting party. In a third exemplary application, the incoming application is a video message in the form of a photograph that includes an image of a person whose image was previously stored in a lookup table of the information distribution system. A label or other descriptor representative of the person is generated and used to select an appropriate response to the submitting party.

An advantage of the invention is that the routing method and system allow significant freedom of selection with respect to both the medium for establishing the communication with the system (e.g., electronic mail, facsimile, Webpage referral, or voice mail) and the content of the communication. The concern, issue, or question of a submitting party will not "fall between the cracks" of a prepared decision tree of an interactive voice response (IVR) system. Consequently, no human operator is necessary to provide a backup for the processing system. Moreover, caller frustration resulting from a long IVR menu is avoided. Another advantage of the invention is that the communications are less likely to be misrouted than would be the case if automatic number identification (ANI) were used to determine anticipated caller needs based upon prior contacts with the caller.

DETAILED DESCRIPTION

Figure 1:
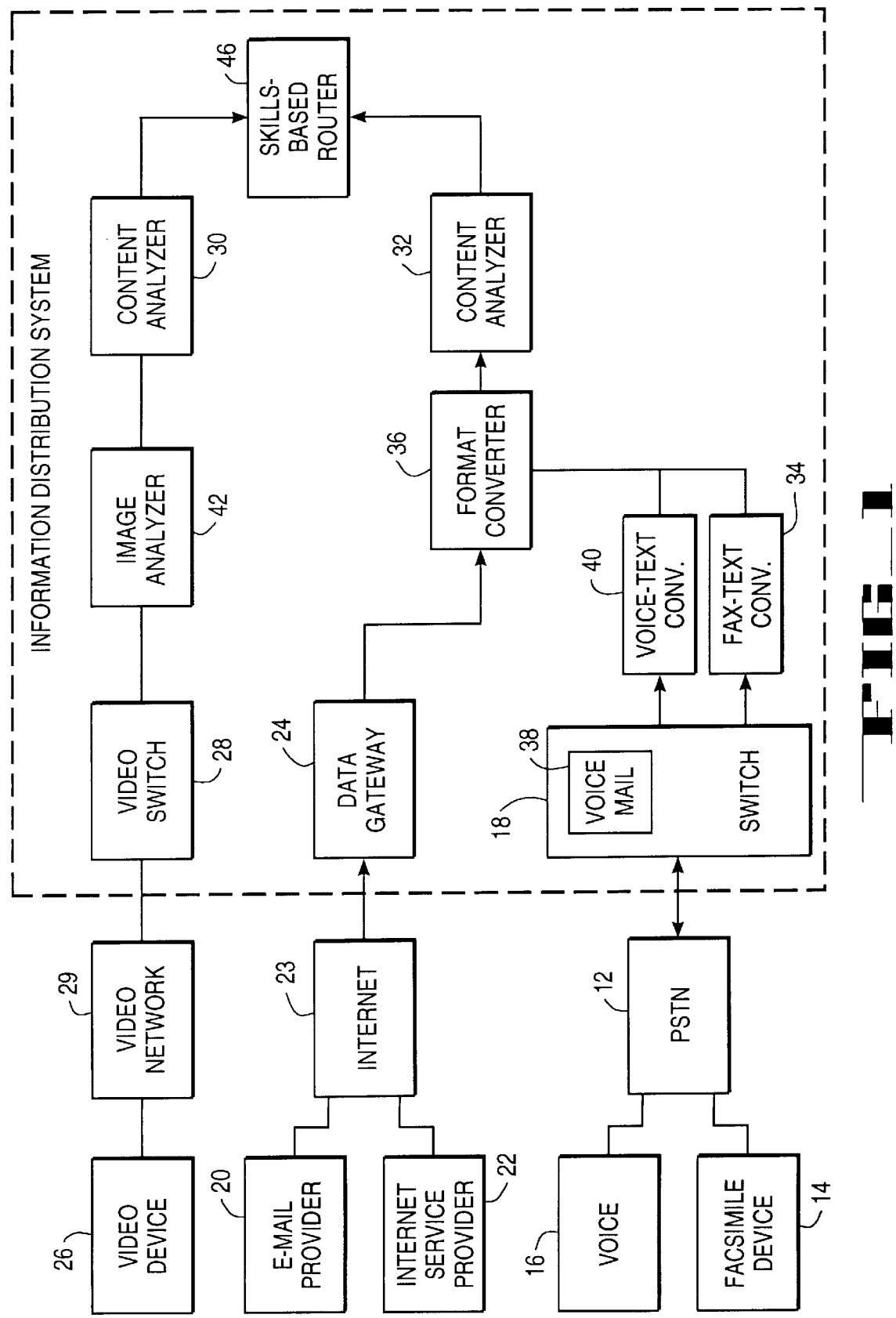
FIG. 1 is a functional block diagram of a routing system that may be used to implement the preferred embodiment of the invention.

FIG. 1 illustrates a preferred embodiment of the present invention. An information distribution system 10 includes components that enable the system to distribute communications based upon correlations between skills advantageous to processing the communications and a selected connectivity option from among various connectivity options. In the preferred embodiment, the information distribution system is an automatic call distribution (ACD) system. The ACD system routes incoming communications from customers to agents of a call center, and permits outgoing communications from the agents to the customers.

Communications between the information distribution system 10 and remote sites preferably are made in a number of different manners. A public switched telephone network (PSTN) 12 is shown as being connected to a facsimile device 14 and a voice input device, such as a telephone 16. The PSTN is linked to switch circuitry 18 of the information distribution system 10. While not critical, the switch circuitry may be circuitry of a private branch exchange (PBX). The facsimile device 14 and the telephone 16 (or other voice input device) are user interfaces that enable substantial content freedom for communications between a submitting party and the information distribution system 10. As will be explained more fully below, the freeform communications are converted to an appropriate format for executing content analysis to determine a routing scheme for the communications or responses to the communications.

Two additional means of providing substantial content freedom for communications between a submitting party and the information distribution system 10 utilize an e-mail provider 20 and an Internet service provider (ISP) 22. An e-mail message directed to the information distribution system 10 via the e-mail provider 20 passes through Internet connections 23 to a data gateway 24 of the system. In its simplest form, the data gateway is a connection to a dedicated digital line that is leased to the system. However, this is not critical, since any means of transmitting an e-mail message to the system may be utilized without diverting from the invention. A message from the ISP 22 may be a Webpage referral in the form of electronic mail or may be in Hypertext Markup Language (HTML). The freeform message is transmitted to the system 10 via conventional Internet connectivity 23.

Another means of directing a message having substantial content freedom is the use of a video device 26. The video device may be a mechanism for digitally transmitting video information of a photograph or other still image. Alternatively, the video device may be a camera for transmitting real-time video information that is either continually processed at the system 10 or is subject to frame capture. The video information is conducted to a video switch 28 at the system 10 via a video network 29. The structure of the video switch is not critical to the invention.

As already noted, each of the components 14, 16, 20, 22 and 26 is a user interface that allows substantial "content freedom," i.e., independence in describing the subject matter that is of interest to the party submitting a communication. For each of the five user interfaces, processing occurs at the information distribution system 10 to allow the content of the message to be analyzed, accommodating the selection of a means for responding to the incoming communication based upon content of the message. In FIG. 1, one content analyzer 30 is dedicated to video messages, while a second content analyzer 32 is employed when a message is received from one of the other four user interfaces.

Prior to input of a message to the second content analyzer 32, the incoming communication undergoes some conversion. If the incoming communication is a facsimile message from the facsimile device 14, the communication is received at the switch circuitry 18 and forwarded to a fax-text converter 34. For example, the fax-text converter may be an optical character recognition (OCR) software module that converts the facsimile transmittal to computer-generated text information, such as ASCII characters. This conversion is a mode-specific conversion, i.e., the processing is unique to the reception of messages from the facsimile device 14. On the other hand, processing at a format converter 36 may include some mode-specific tasks, but preferably the output of the converter 36 is in a format that is consistent for each of the four user interfaces 14, 16, 20 and 22 that provides an input to the format converter. The consistent format of the preferred embodiment facilitates content analysis at the analyzer 32.

An incoming communication from the voice input device 16, e.g., a telephone, may be recorded at a conventional voice mail device 38 and converted to text at a voice-text converter 40. The voice-text converter is a second mode-specific device that provides an input to the format converter 36. The voice-text converter may be a speech recognition module that converts the recorded freeform voice mail message into text information. The format converter then presents the computer-searchable text information in an appropriate format to the content analyzer 32. For example, the content-searchable text information may be ASCII characters.

The format conversion at the converter 36 may be less significant for electronic mail received from the e-mail provider 20, since the incoming message is text information. For example, it may only be necessary to strip a header from the received e-mail message. As previously noted, the preferred embodiment of the format converter 36 provides a consistent format regardless of the source of a message.

An incoming communication from the Internet service provider 22 may be a Webpage referral in the form of e-mail or HTML. Regardless, the message received via the ISP undergoes format conversion at the converter 36 to provide computer-searchable text information.

A second content analyzer 32 analyzes the formatted messages from the converter 36 to identify skills that are advantageous to processing the messages. The analysis may comprise classification, semantic analysis and rule-based decision-making with keywords, phrases and grammar-based parsing. The complexity of the analysis performed will depend on the requirements of each implementation. In one embodiment, the analysis includes a word query of the computer-searchable text information. A Boolean word search may be used, allowing a number of different keywords to be linked by logical operatives such as "AND," "OR" and "NOT" or their functional equivalents. As one example, within an ACD system that is used for product support for a company that sells both computer hardware and computer software, generic and proprietary descriptors may be used as keywords. Additional keywords may be terms common to frequently asked questions (FAQs) submitted to the company. Another skill that is advantageous to efficient processing of the incoming message relates to the medium that is to be used to respond to the message. If the system 10 is an ACD system, responses that require an agent to respond via the ISP 22 or the e-mail provider 20 will require an agent who is knowledgeable with respect to the particular mode of response.

The content analyzer is typically a content analysis software module and is understood by persons skilled in the art.

Such software modules are well known for executing Boolean word searches of computer databases. Nevertheless, other techniques may be utilized. For example, the voice-text converter 40, the format converter 36 and the content analyzer 32 may be combined into a single unit for incoming telephonic communications. A speech recognition module and content analysis module may be combined in a keyword search to identify skills that are advantageous to processing the communication. That is, the conversion to text information is not critical to all applications, but is preferred.

Messages from the video device 26 are input to an image analyzer 42. The image analyzer searches the video data for system recognizable features. For example, the image analyzer may match images of individuals to images stored in a lookup table at the information distribution system 10. The image analyzer outputs labels, or other descriptors, that are received at the first content analyzer 30. The operation of the first content analyzer 30 is similar to the operation described above with reference to the second content analyzer 32.

Figure 2:
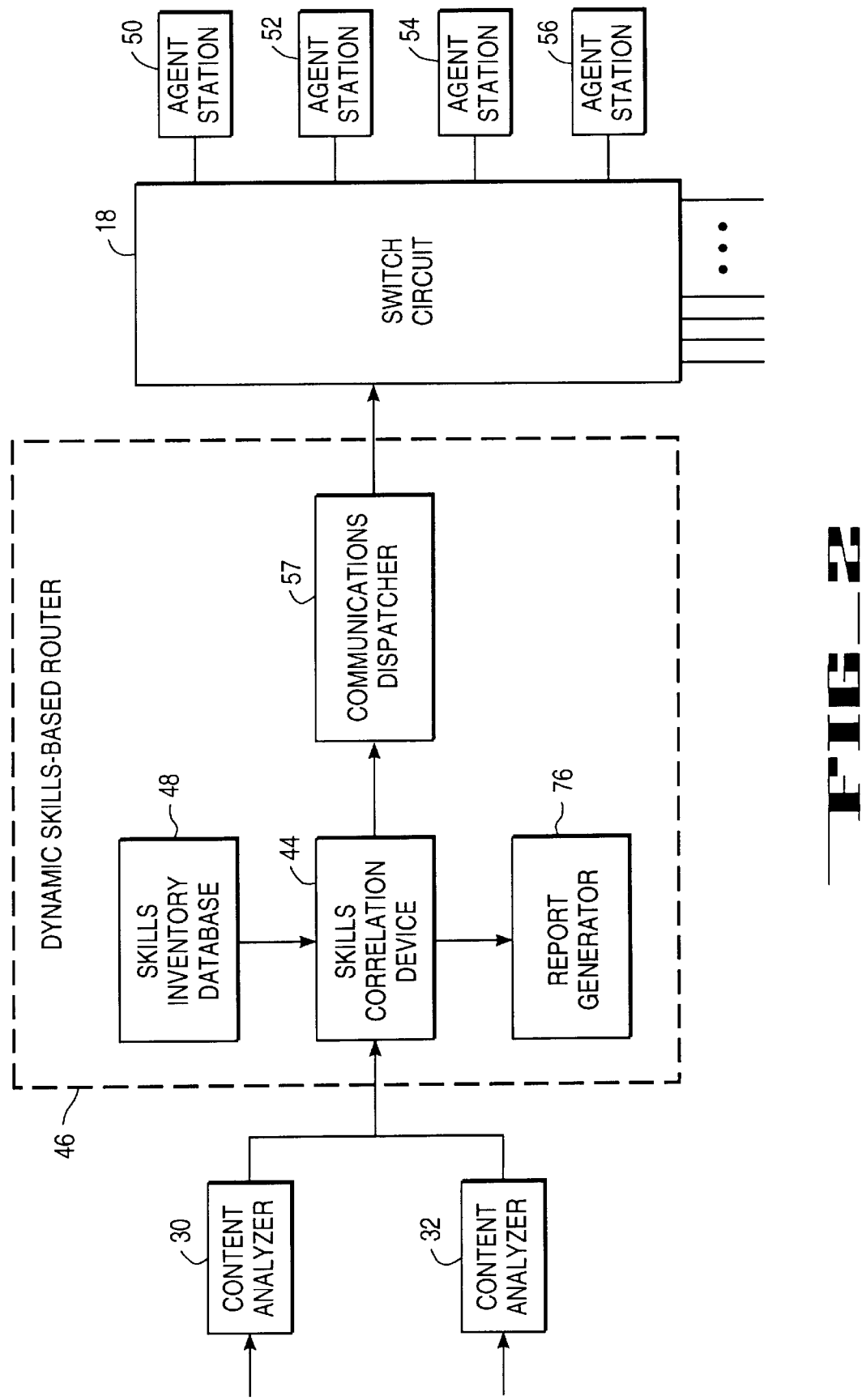
FIG. 2 is a functional block diagram of a skills-based router for use with an automatic call distribution system of FIG. 1.

For each incoming communication received from one of the user interfaces 14, 16, 20, 22 and 26, the associated content analyzer 30 and 32 outputs information indicative of the skills that are advantageous to processing the incoming communication. Referring now to FIGS. 1 and 2, this information is received at a skills correlation device 44 of a dynamic skills-based router 46. A second input to the correlation device 44 is the output from a skills inventory database 48 that includes résumé data indicative of proficiencies of the agents with respect to various skills advantageous to processing typical incoming communications. The correlation device determines a "best fit" between the communications-handling skills identified at the content analyzer 30 and 32 and the connectivity options available to the system 10. In the preferred embodiment, the system is an ACD system and the "best fit" is a determination of the appropriate ACD agent for handling the communication. At least partially based upon the resume data contained in the skills inventory database 48 and the identified communications-handling skills of the content analyzer, the incoming communications are routed to the agents on a one-by-one basis.

Typically, the determination of the "best fit" is based upon a message from only one of said user interfaces 14, 16, 20, 22 and 26. However, in some applications of the information distribution system 10, more than one mode of message transmission may be utilized by a submitting party to convey a single concern, question or issue. For example, an e-mail message requesting information relating to redesigning a specific item may be transmitted to the system at approximately the same time as a video transmission showing the item, the redesign or both. By cross-linking the two messages, the process of determining the appropriate communications-handling skills is improved.

In the ACD application of FIG. 2, a number of agent stations 50, 52, 54 and 56 are shown as being connected to the switch circuitry 18 described above. With regard to the incoming communications, the assignment of ACD agents is based upon the skills correlation determined at the device 44 and is controlled by a communications dispatcher 57. In the preferred embodiment, each agent station supports communications with a number of the user interfaces 14, 16, 20, 22 and 26. For example, each station may include a telephone and a computer that supports facsimile and electronic mail transmissions, as well as video transmissions and connectivity via the Internet.

The dynamic skills-based router 46 is an adjunct component that controls the distribution of incoming communications to selected agents at the stations 50–56. The adjunct router is a combination of computer software and hardware. The device may be physically implemented in a stand-alone computer that interfaces with the switch circuitry 18 or may be physically attached to the switch circuitry. In the preferred embodiment, the router is a separate component in order to facilitate installation and maintenance of the adjunct router.

For each ACD agent, a resume is formed and stored at the skills inventory database 48. A resume is a formal listing of the skills that an agent possesses. In one embodiment, the resume describes both the level of ability, i.e. expertise, in each skill and the level of preference that system management has for the agent to handle communications that require particular skills versus communications that require other skills.

In the preferred embodiment, the skills inventory database 48 is implemented using a relational database model. Therefore, the database may include several tables of definitions, such as a skills table, an agents table and a resume-details table.

Figure 3:
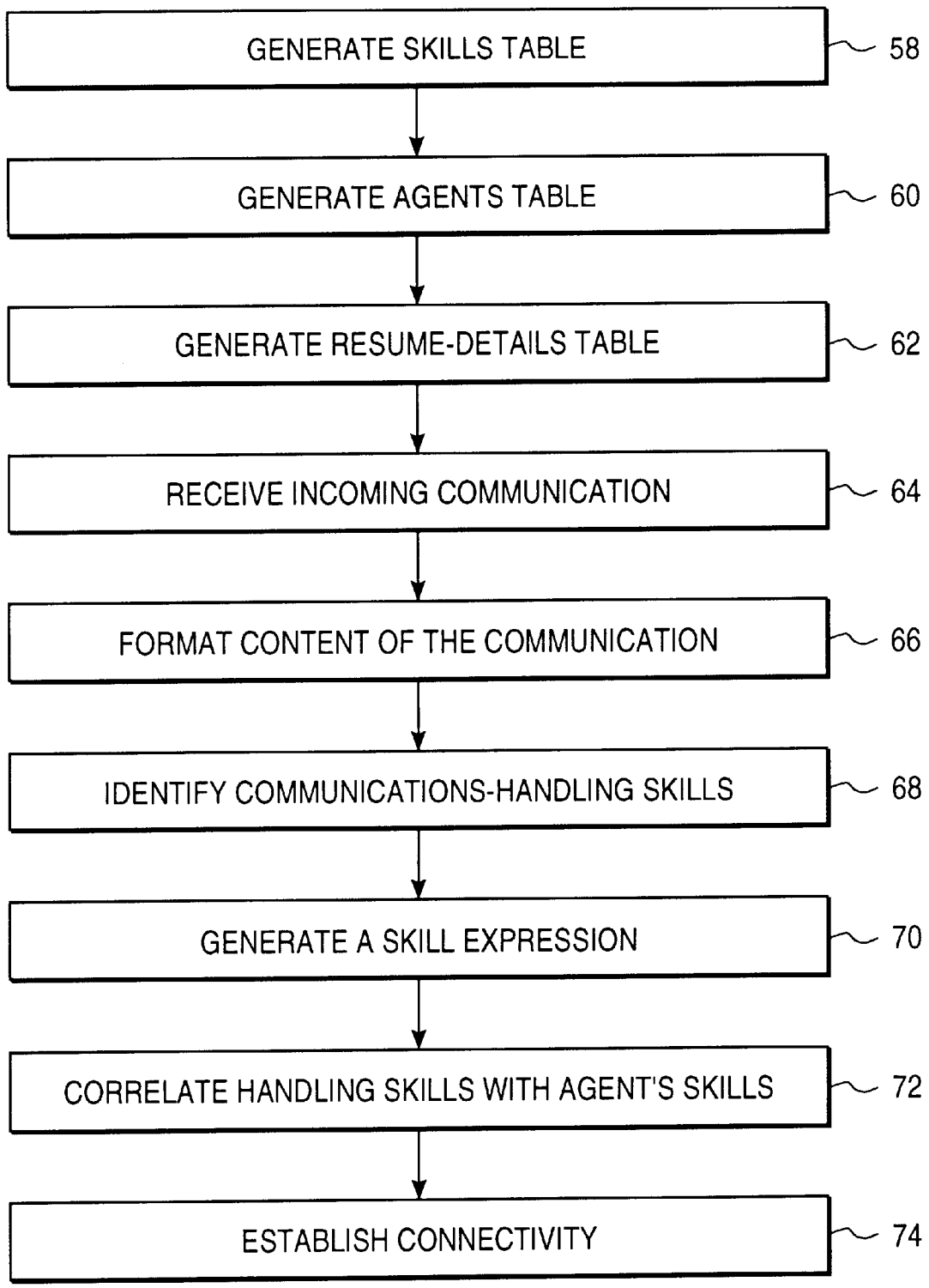
FIG. 3 is a flow chart of steps for routing an incoming communication in accordance with the invention.

Referring now to FIG. 3, a process for utilizing the dynamic skillsbased routing is shown. The process includes the setup steps 58, 60 and 62 that establish the conditions for subsequent incoming communications. A first step 58 is to generate the skills table. In one embodiment, the skills table contains a list of all of the valid values for a "skill" relevant to handling incoming communications of the ACD system. A "skill" is a job or area of expertise in which an agent has competence or experience. A "skill" may be further defined as being unique to an individual or common to various individuals. This skill commonality may be considered as creating a "team." For example, a team may be formed by designating a skill as "sales" and assigning a skill level from 1 to 9, with an agent having a skill level of 1 being considered a novice and an agent who has achieved a skill level of 9 being considered a team leader. However, the creation of teams is not equal to the static grouping of conventional communications management methods and systems. Individual agents may be members of any number of teams, provided the skill code for each team is included in the agent's resume. The creation of teams by means of the generation of a skills table allows system management to capture the advantages of conventional ACD groups, without the limitations of static grouping.

In step 60, the agents table is generated. This table contains a list of all of the agents of the ACD system and stores important data regarding each agent. A RésuméCode field is used to access agent résumés. Specifically, associated with each agent in the agents table is a RésuméCode field that can be used as an identifier of the agent when the agents table is queried to look up the skills of the particular agent. The résumé-details table is generated at step 62. This table details the identifier of each skill in order to reference back to the skills table and details the agents RésuméCode to reference back to the agents table. In addition, the résumé-details table contains skill levels, skill preferences and excluded flags. A skill level is the level of knowledge or expertise that a particular agent has achieved in a given skill. That is, the skill itself is identified in the skills table generated in step 58 and the rating is identified in the resume-details table. While not critical, the skill levels may be ratings on a scale of 1 to 9, with 9 indicating the greatest level of expertise.

A skill preference is a relative weighting of the system management's desire to have a particular agent handle incoming communications requiring a particular skill or relating to a particular customer. Skill preferences can be used to reserve uniquely qualified agents for handing communications that require particular expertise. As an example, the first agent may possess three skills: SKILL A, SKILL B, and SKILL C. If many other agents have been well trained to handle transactions requiring SKILL A and SKILL B, but only the first agent has SKILL C, the system might place a high preference on SKILL C for the first agent. Thus, only when no transactions are enqueued requesting SKILL C will the first agent handle calls requesting SKILL A or SKILL B. Skill preferences may be rated on a scale of 1 to 9, with 9 indicating the greatest preference of system management for the agent to handle incoming communications requiring the skill.

Excluded flags may be identified in the résumé-details table to denote whether or not a particular skill is an "excluded skill" for a particular agent. Excluded skills are skills in the agent's résumé that the agent is not permitted to handle under any circumstances. As an example, in a commission-based sales organization, it may be necessary to restrict certain individuals from handling a type of communication that requires proper professional certification.

After the three tables have been formed in steps 58, 60 and 62, the skills inventory database 48 of FIG. 2 has the information necessary for skills-based communications routing. This information is accessible by the skills correlation device 44. In step 64, an incoming communication is received at the information distribution system 10 of FIG. 1. The communication is transmitted from one of the user interfaces 14, 16, 20, 22 and 26 or from another device that allows substantial content freedom. The content of the message is converted to a computer-searchable format at step 66. The conversion takes place at the video image analyzer 42 or the format converter 36 of FIG. 1, as described above. Optionally, the incoming communication may be a combination of two transmissions from two different user interfaces, such as a voice message from the voice input device 16 and a video transmission from the video device 26. The two transmissions are crosslinked at the system 10 and used in combination to determine which communications-handling skills are relevant.

The formatted content is searched at the appropriate content analyzer 30 or 32. Step 68 of FIG. 3 is a step of identifying communications-handling skills. In one embodiment, a skill expression is generated, as shown at step 70. Each incoming communication is associated with a skill expression. The "skill expression" is a simple formalism for stating the skills that are required or advantageous to processing the associated communication. As an example, the skill expression may be DATABASE, 5 AND INPUT, 5 AND E-MAIL 7. This expresses a requirement for an agent with at least a "5" level of expertise in a database program, who also has at least a "5" level of expertise in data input, and who has at least a "7" level of expertise with respect to responding to communications via electronic mail. In addition to the "AND" operator, "OR" and "NOT" logical operators may be utilized in a skill expression, or characters may be substituted for the three logical operators.

Skill expressions may also allow a designation of communications-handling skills as being "mandatory" or "optional." A mandatory skill is a skill that is required for an agent to process the particular communication. An optional skill is a skill that system management would prefer an agent to possess for handling the communication, but which is not critical to successful processing of the communication.

In step 72, the communications-handling skills identified in step 68 are correlated with the resume data of the skills inventory database 48 in order to find a "best fit" of skills. In one implementation of this step, a "skills score" is calculated. A skills score is indicative of the correlation between the attributes of the agents and the desired abilities for handling a particular communication. That is, the skills score is a numeric measure of how well a particular agent's résumé data match the skill expression associated with the communication. The closer that the skills score is to 0, the better the match in terms of the goals of system management. A positive skills score indicates an over-qualified agent, while a negative skills score indicates an under-qualified agent. Optionally, there is a preference to utilize over-qualified agents over under-qualified agents. This can be ensured by applying a penalty factor if a skills score is negative. For example, a negative skills score can be penalized by multiplying the score by a penalty factor of −1000. Since the "best fit" is determined by identifying the skills score that is closest to 0, the penalty factor will effectively eliminate routing to under-qualified agents if an over-qualified agent is available.

In step 74, connectivity is established based upon the skills correlation of step 72. The implementation of step 74 will be according to the business purpose of the information distribution system 10 and the mode of the incoming communication. If the incoming communication is from one of the facsimile device 14, the e-mail provider 20, or the ISP 22, the connectivity may merely be a transmittal of information of the submitting party's concern, issue or question, with instructions as to the mode for responding to the submitting party. The mode may be identical to the mode selected by the submitting party (e.g., a facsimile transmittal, an e-mail message, or a post on a Webpage). Alternatively, the responding mode may be different than the original mode, such as an agent-to-customer telephone call in response to received electronic mail or video message.

If the incoming communication is a telephone call in which the submitting party identified a concern, issue or question in a freeform voice mail message and remained in a call queue, the connectivity established at step 74 may route the call immediately to the selected agent. On the other hand, if the voice mail message was recorded and the submitting party terminated the call, the connectivity may be one in which the concern, issue or question is submitted to the selected agent with instructions as to the mode for responding to the communication. As another alternative, a customer of an ACD system initiates a call and inputs a voice message at the voice mail device 38 of FIG. 1, but remains on-line. The customer is on call "hold" while the routing decisions of FIG. 3 are implemented. If the ACD agent or other connectivity option selected by the dynamic skills-based router 46 is presently unavailable, the system may schedule a call-back to the customer. This may include an automated identification of the scheduled call-back to the customer, with a voice prompt requesting the customer to approve or disapprove the connectivity option.

In addition to connectivity, the information distribution system may determine tasks that are submitted to an ACD agent in addition to the received message. Such a task may be instructions as to the handling of a return telephone call to a customer. Other information can also be routed to the agent of interest. The source of the information may be a stored database that is accessed based upon determination of the customer's name, account number or the like. For a video message, the access may be automatically implemented upon recognition of a particular image, such as the image of the customer.

In the preferred embodiment, the adjunct router 46 of FIG. 2 includes a report-generating component 76. The use of this component with the skills inventory database facilitates evaluations of the quality of service of the system. In the preferred embodiment, agent summary reports, skills summary reports, and match analysis reports are generated. An agent summary report relates to and is organized according to activity of particular individuals. This report covers all skill expressions for communications handled by the particular individual. The report is categorized by selected agents. The skills summary report is related to skill expressions. This report lists all agents who were on-duty in a time period in which an incoming communication having a particular skill expression was handled by one of the agents. The report is categorized by skill expressions. The match analysis report is related to identified agent abilities advantageous to processing incoming communications. The match analysis report is similar to the skills summary report, but does not provide the breakdown on a per agent basis. The report may indicate the skill expressions that are being requested most often, and may indicate the level of service provided for each skill expression.

While the method and system have been described primarily with reference to an ACD system having available agents, this is not critical. The method may be utilized in other information distribution systems. For example, a freeform telephone voice mail message may be converted to a computer-searchable format that is content analyzed to identify the communications-handling skills that are "best fit" to one of a number of different connectivity options, such as one information-conveying recording within a selection of different information-conveying recordings. Similarly, the content analysis of a message received from the facsimile device 14, the e-mail provider 20, or the ISP 22 may automatically trigger a responsive return transmittal to the submitting party. In one such application, a received facsimile transmission is converted into a computer-searchable format and is subjected to a Boolean keyword search to automatically determine which one of a variety of facsimile options (i.e., connectivity options) should be transmitted to the submitting party.

Figure 4:
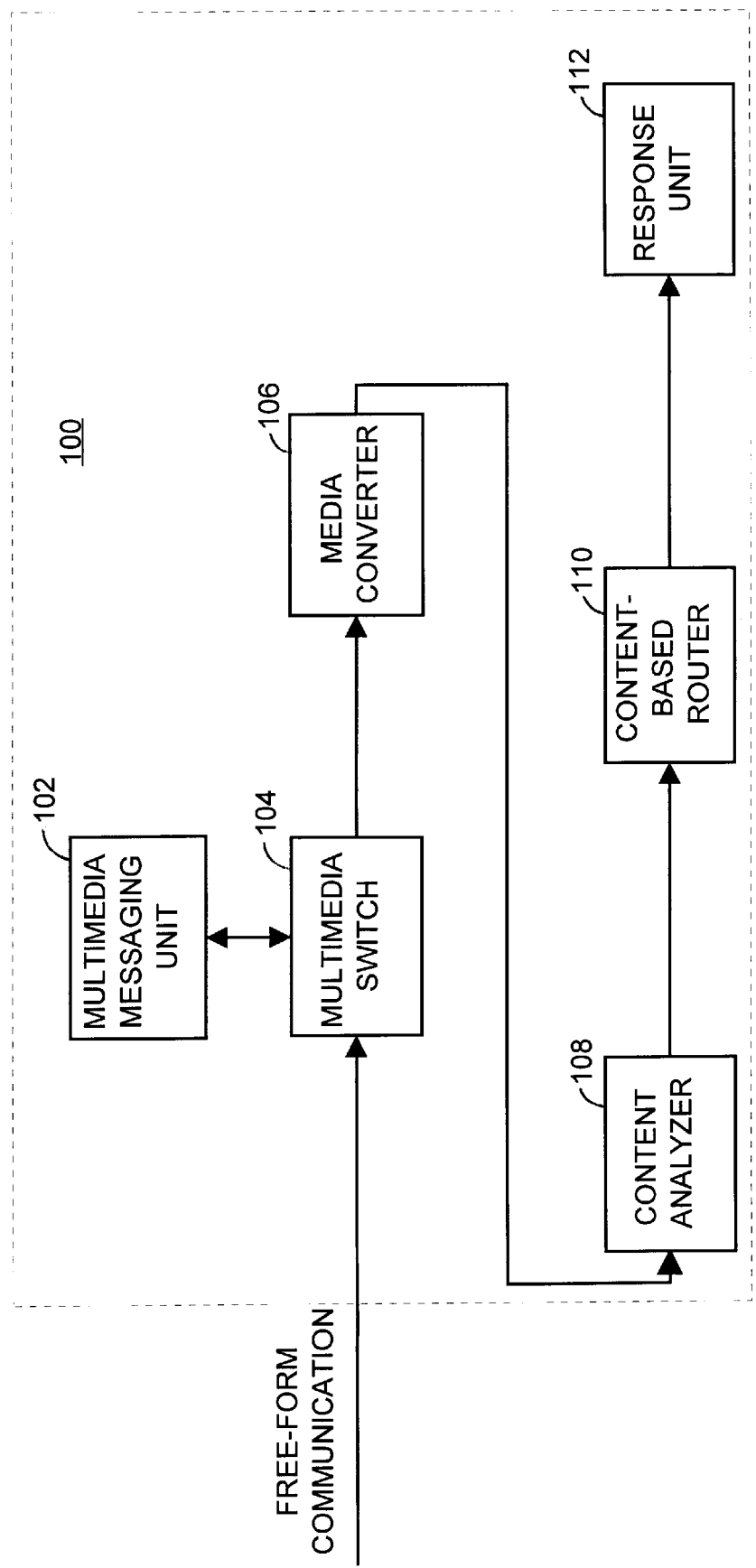
FIG. 4 is a functional block diagram of a multimedia communications response system of the present invention.

FIG. 4 illustrates a more general block diagram of a multimedia communication response system 100 of the present invention. The response system 100 receives freeform communications from one or more of a variety of sources, in one or more of a variety of medium. For example, the communication may be a video clip, a photographic image, an E-Mail message, a facsimile, a voice message or real time voice, or an Internet form or other communication received from the World Wide Web. A multimedia switch 104 controls the routing of the incoming communications. The response system 100 also comprises a multimedia messaging unit 102, which may be used to store communications of various media. For example, the messaging unit 102 may store an incoming facsimile communication until the response system 100 is prepared to process the communication. Thus, the switch 104 may route incoming communications directly to a media converter 106, or it may route the incoming communications to the messaging unit 102 for storage. At some later time, the switch 104 can retrieve the stored communications from the messaging unit 102 and forward the communications to the media converter 106. Alternatively, the media converter 106 can access the stored communications directly from the messaging unit 102.

The media converter 106 preferably converts each incoming communication to a common medium. The media converter 106 may also modify the format of the communication. Preferably, the resulting medium and format can be readily processed by a computer. For example, the media converter 106 may generate an ASCII communication having a predefined format, where the converted communication has generally the same informational content as the incoming communication, at least for the purposes of the response system 100. As described previously, the particular conversion performed by the media converter 106 depends on the medium and format of the received communication. For example, if the received communication is a facsimile communication, the conversion may involve an OCR process.

The media converter 106 sends the converted communication to a content analyzer 108. The content analyzer 108 performs certain operations to extract relevant information from the freeform communication. The relevant information may include information about the substance and format of a desired response, information about the identity of the sender of the original communication and information about a particular time at which the sender would like to receive a response. The particular operations performed to extract this information depend on the particular implementation. For example, the scope of the content analysis may depend on the possible types of responses that can be provided. If there are relatively few possible responses that can be provided, then a simple keyword search may suffice to determine which possible response provides a best fit for the content of the communication. On the other hand, if the possible routes for the communication and/or the possible responses are numerous, a more complex content analyzer 108 may be required. A more complex content analyzer 108 could implement classification, semantic analysis and rule-based decision-making with keywords, phrases and grammar-based parsing. Various of these techniques are known in the art.

The content analyzer 108 sends relevant information extracted from the communication to the content-based router 110. The content-based router 110 compares the information extracted from the communication with information about the possible responses or connectivity options available in the response system 100. The router 110 activates the connectivity option that provides the best fit with the content of the communication, so that the connectivity option provides a response. In some embodiments, the router 110 may pass the information that was extracted from the communication to the selected connectivity option to facilitate a more efficient and effective response. In other embodiments, forwarding the extracted information may not be necessary. The response unit 112 contains the connectivity options that actually provide the responses to the incoming communications, based on information or instructions received from the router 110.

In the preferred embodiment described above, the content-based router 110 comprises a skills based ACD router 46 and the response unit 112 comprises a number of agents 50, 52, 54 and 56, where the router 110 selects an agent 50–56 to respond to an incoming communication. In another embodiment, the router 110 may determine an appropriate document or other set of information that can be sent in response to the incoming communication. In this embodiment, the response unit 112 may comprise a database of documents or other information and one or more communication units for sending the selected information to an appropriate destination. Various other embodiments of the present invention are also possible. For example, the response unit 112 may comprise a combination of one or more of the following: human agents that are able to respond in real time to an incoming communication, human agents that are able to respond to an incoming communication after some delay, communication units that are able to automatically respond to an incoming communication by transmitting stored information, software agents that are able to actively seek out information that can be transmitted in response to the incoming communication and expert systems that can automatically analyze provided information and provide an intelligent response. The forms of response can vary as well. For example, a response can take the form of a real time telephone conversation, a call back at some later time (possibly specified by user in communication), a facsimile transmission, an E-Mail message, a pre-recorded voice message, a video clip or other visual information, an Internet or other online download, or even a printed document by postal service. The response could also involve the provision of commercial products and services. For example, a response to a communication could include sending the user an ordered product, billing a user for an ordered product, modifying a database containing information about the user and modifying the parameters of a service provided to the user. In addition, more than one type of response could be provided for a single incoming communication. For example, a response may include sending the user a document by facsimile and calling the user back after waiting a sufficient amount of time to allow the user to receive and review the facsimile.

The router 110 can preferably route a communication to any connectivity option that is available in the response unit 112. For example, some communications may lead to a real time response by an agent in a call center, while other communications may lead to a delayed transmission of information via E-Mail. A user of the response unit 100 can preferably request a particular type of response. For example, the user may place a telephone call to the response unit 100 and request that certain information be sent to the user by facsimile at a specified facsimile number. The content analyzer detects the substance of this request and informs the router 110. Even if a call center agent is available, the router 110 will determine information within the response unit 112 that provides the best fit with the criteria specified by the user, and the router 110 will instruct the response unit 112 to transmit the information to the user by facsimile.

Figure 5:
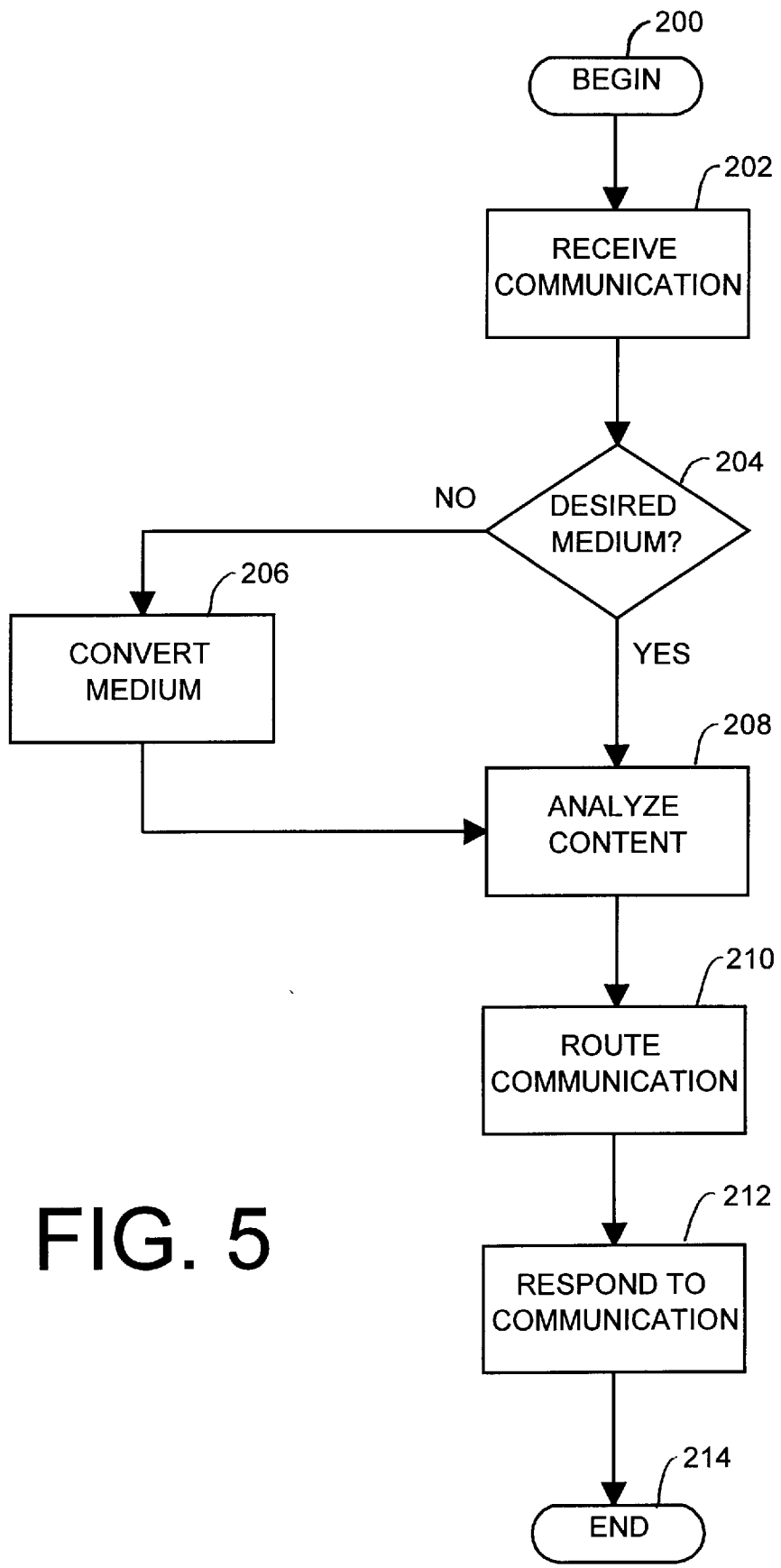
FIG. 5 is a flow chart of a method performed by the response system of FIG. 4.

FIG. 5 illustrates a method performed by the response system 100 of FIG. 4. The method begins at an initial step 200. At a process block 202, the system receives an incoming freeform communication. At a decision block 204, the system determines whether the incoming communication is in a medium and format that is suitable for content analysis. If not, the media converter 106 converts the communication to a suitable medium and format at a process block 206. At a process block 208, the content analyzer 108 analyzes the converted communication for information that is relevant to a response, such as the type of response required, to whom and in what medium the response should be sent, and a desired time for the response. At a process block 210, the content-based router 110 uses the information obtained by the content analyzer 108 to route the communication to the connectivity option that provides the best fit. At a process block 212, the response unit 112 responds to the communication in an appropriate manner. The process of FIG. 5 ends at a terminal block 214.

What is claimed is:

1. A routing method for distributing communications to a plurality of individuals comprising steps of:

storing résumé data indicative of proficiencies of said individuals with respect to skills advantageous to processing said communications;

enabling reception of incoming communications having substantial content freedom;

formatting original message content of each of said incoming communications in a program-searchable format;

searching said original message content of each formatted incoming communications to determine which skills are advantageous to processing said incoming communications; and at least partially based upon correlations between said stored résumé data and said determined skills advantageous to processing said incoming communications, routing said incoming communications to said individuals on a one-by-one basis.

2. The routing method of claim 1 wherein said step of formatting said original message content of each incoming communication includes generating text information of a message submitted in said incoming communication.

3. The routing method of claim 2 wherein said step of searching said original message content includes executing a word query of said text information.

4. The routing method of claim 3 wherein said step of executing said word query is a Boolean word search.

5. The routing method of claim 1 further comprising a step of receiving said incoming communications in a form of telephonically recorded voice messages, said step of formatting original message content of said incoming communications including generating computer-generated text information representative of said voice messages.

6. The routing method of claim 1 further comprising a step of receiving said incoming communications in a form of text messages transmitted via a computer network.

7. The routing method of claim 6 wherein said step of receiving text messages is a step that includes at least one of receiving electronic mail and receiving text messages originating from a site of the World Wide Web.

8. The routing method of claim 1 further comprising a step of receiving said incoming communications in a form of a facsimile message, said step of formatting original message content of said incoming communications including utilizing optical character recognition techniques.

9. The routing method of claim 1 further comprising a step of receiving said incoming communications in a form of video transmissions, said step of formatting original message content of said incoming communications including utilizing image analysis to generate descriptors in response to recognizing image features of said video transmissions.

10. The routing method of claim 9 further comprising a step of associating a video transmission from a submitting party with at least one non-video incoming communication from said submitting party such that said combination is used in said determining which skills are advantageous.

11. The routing method of claim 1 wherein said step of storing résumé data is a step of identifying proficiencies of automatic call distribution (ACD) with respect to different call-handling requirements.

12. A routing method for an information distribution system comprising steps of:

receiving an incoming communication having significant freedom of message content, said incoming communication being from a submitting party;

converting original message content of said incoming communication to a computer-searchable format;

executing content analysis of said original message content in said computer-searchable format, including searching said original message content of said incoming communication for a specific subject;

based upon said content analysis, determining criteria for conveying desired information responsive to said incoming communication;

based upon said determined criteria, selecting a connectivity option among a plurality of connectivity options; and establishing a connection with said submitting party in accordance with said selected connectivity option.

13. The routing method of claim 12 wherein said step of converting said original message content to a computer-searchable format includes generating computer text information and wherein said step of executing content analysis includes implementing a word search of said computer text information.

14. The routing method of claim 13 wherein said step of executing content analysis includes a Boolean word search.

15. The routing method of claim 12 wherein said step of receiving said incoming communication is a step of receiving a message at an automatic call distribution (ACD) system, said step of selecting said connectivity option being a selection of an ACD agent having pre-established skills advantageous to handling said message.

16. The routing method of claim 12 wherein said step of receiving said incoming communication includes receiving a voice message and wherein said step of converting said original message content includes using speech recognition to convert said voice message to computer-searchable text information.

17. The routing method of claim 12 wherein said step of receiving said incoming communication includes receiving one of an electronic mail message or a message transmitted via a site on the World Wide Web.

18. The routing method of claim 12 wherein said step of receiving said incoming communication includes receiving a facsimile transmittal and wherein said step of converting said message includes generating computer text information using optical character recognition techniques.

19. The routing method of claim 12 wherein said step of receiving said incoming communication includes receiving video information and wherein said step of converting said original message content includes generating descriptors using image analysis to recognize features within said video information.

20. A routing system for distributing communications to ACD agents comprising:

memory means for storing résumé data indicative of proficiencies of each of said ACD agents with respect to skills advantageous to processing calls;

means for receiving incoming communications having substantial freedom of content;

means, connected to said receiving means, for formatting original message content of said incoming communications in a computer-searchable format;

content analysis means, connected to said formatting means, for searching said formatted original message content of said incoming communications for keywords indicative of skills advantageous to processing said incoming communications; and correlation means for selecting among said ACD agents to handle said incoming communications in response to correlations between skills of said ACD agents as indicated within said stored résumé data and skills advantageous to processing said incoming communications.

21. The routing system of claim 20 wherein said means for receiving incoming communications includes a voice message recorder, said formatting means including a speech recognition device.

22. The routing system of claim 20 wherein said means for receiving incoming communications includes a network connection for receiving at least one of electronic mail and transmissions from a site on the World Wide Web.

23. The routing system of claim 20 wherein said means for receiving incoming communications includes a facsimile machine, said formatting means including an optical character recognition device.

24. The routing system of claim 20 wherein said means for formatting said original message content includes an image analyzer responsive to a video transmission received by said means for receiving incoming communications.

* * * * *